(12) United States Patent
Kim

(10) Patent No.: US 11,927,397 B2
(45) Date of Patent: Mar. 12, 2024

(54) TUBE ASSEMBLY FOR HEAT MANAGEMENT APPARATUS AND METHOD OF MANUFACTURING THE SAME

(71) Applicant: HYUNDAI MOBIS CO., LTD., Seoul (KR)

(72) Inventor: Hwa Sung Kim, Pyeongtaek-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 181 days.

(21) Appl. No.: 16/737,095

(22) Filed: Jan. 8, 2020

(65) Prior Publication Data
US 2020/0217589 A1    Jul. 9, 2020

(30) Foreign Application Priority Data

Jan. 8, 2019   (KR) .................. 10-2019-0002416

(51) Int. Cl.
*F28D 1/03*     (2006.01)
*F28F 1/02*     (2006.01)
(Continued)

(52) U.S. Cl.
CPC ............ *F28D 1/0391* (2013.01); *F28F 1/022* (2013.01); *B21C 37/151* (2013.01); *B23K 1/0012* (2013.01); *B23K 2101/14* (2018.08); *B23P 15/26* (2013.01); *F28D 2021/0082* (2013.01); *F28D 2021/0084* (2013.01); *F28F 1/40* (2013.01); *F28F 3/025* (2013.01)

(58) Field of Classification Search
CPC ...... F28D 1/03; F28D 1/0391; F28D 1/05391; F28D 2021/0082; F28D 2021/0084; F28F 1/02; F28F 1/022; F28F 17/005; F28F 3/025; F28F 1/40; F28F 2255/08; F28F 1/12
See application file for complete search history.

(56) References Cited

U.S. PATENT DOCUMENTS 7,836,944 B2 *  11/2010  Antonijevic ............. F16L 9/19
                                                       165/177
10,215,496 B2 *  2/2019  De Vos .................. F28D 7/0008
(Continued)

FOREIGN PATENT DOCUMENTS

DE    102008007601 A1 *  8/2009  ............ B21C 37/14
JP    2007-271182 A      10/2007
(Continued)

*Primary Examiner* — Harry E Arant
(74) *Attorney, Agent, or Firm* — NSIP Law

(57) ABSTRACT

The present invention is directed to providing a tube assembly for a heat exchanger or heat management apparatus in which the tube assembly can be integrally assembled using inner fin tubes having a two-row structure and drainage performance and corrosion resistance performance can be improved. The tube assembly for the heat exchanger or heat management apparatus includes a first- and second-row tube including an inner fin type tube respectively, a central connection portion that connects the first-row tube to the second-row tube, and a header in which a first- and a second-row tube hole, into which ends of the first- and the second-row tube are inserted, are arranged, wherein a cut portion formed in the direction opposite to the ends of the first- and the second-row tube inserted into the header is included in the central connection portion.

6 Claims, 7 Drawing Sheets

(51) Int. Cl.
*B21C 37/15* (2006.01)
*B23K 1/00* (2006.01)
*B23K 101/14* (2006.01)
*B23P 15/26* (2006.01)
*F28D 21/00* (2006.01)
*F28F 1/40* (2006.01)
*F28F 3/02* (2006.01)

(56) References Cited

U.S. PATENT DOCUMENTS

| | | |
|---|---|---|
| 2007/0096611 A1 | 5/2007 | Antonijevic et al. |
| 2014/0231048 A1 | 8/2014 | De Vos et al. |
| 2016/0054075 A1* | 2/2016 | Taras .................... F28D 1/0391 165/173 |

FOREIGN PATENT DOCUMENTS

| | | |
|---|---|---|
| JP | 4540839 B2 | 9/2010 |
| KR | 10-2011-0134679 A | 12/2011 |
| KR | 10-2013-0100245 A | 9/2013 |

* cited by examiner

TUBE ASSEMBLY FOR HEAT MANAGEMENT APPARATUS AND METHOD OF MANUFACTURING THE SAME

CROSS-REFERENCE TO RELATED APPLICATION

This application claims priority to and the benefit of Korean Patent Application No. 10-2019-0002416, filed on Jan. 8, 2019, the disclosure of which is incorporated herein by reference in its entirety.

BACKGROUND

1. Field of the Invention

The present invention relates to a heat exchanger for vehicle air conditioning or a refrigerant type battery heat management apparatus. More particularly, this invention relates to a tube assembly for a heat exchanger or heat management apparatus, and to a method of manufacturing the same.

2. Discussion of Related Art

Vehicle air conditioning systems largely include a compressor, a condenser, an evaporator, and an expansion valve. Among them, the condenser and the evaporator constitute a heat exchanger. The condenser receives refrigerant in a high-temperature and high-pressure gas state from the compressor and condenses the refrigerant into a liquid refrigerant through heat exchange with outdoor air. The evaporator evaporates liquid-gaseous refrigerant into a gaseous state through heat exchange with air inside the vehicle and delivers the gaseous refrigerant to the compressor.

Referring to FIG. 1, the evaporator includes tubes 11 through which a refrigerant flows, fins 13 for heat exchange with air, a header 15 and a tank 17 into which the tube 11 is inserted therebetween so that the refrigerant may flow through the tube 11, and a side plate 19 that supports the fin 13 and the tube 11. In addition, a baffle, a cap, or the like may be added to the evaporator.

In this way, the tubes in the evaporator and the condenser are provided in two rows of a multi-path so as to attain the performance of vehicle air-conditioning and improve temperature distribution. FIG. 2 illustrates tubes having a two-row structure. The tubes constitute a multi-channel with several holes so as to withstand pressure of the refrigerant and increase a heat transfer rate.

Also, FIGS. 3A and 3B are cross-sectional views taken along line A-A' of one tube 11a of two-row tubes shown in FIG. 2. FIG. 3A illustrates a multi-channel 21 using a general extrusion method, and FIG. 3B illustrates an inner fin type tube that is the recent art in which a rolling material is folded to process a shape of a folded tube 23 and an inner fin 25 is inserted therein.

Meanwhile, in recent electric vehicles, extrusion tubes are arranged in a plurality of rows, for example, four rows, in a refrigerant type cooler or heat management apparatus used for battery cooling so as to constitute a refrigerant flow path.

However, an extrusion tube according to the related art has a limitation in the selection of a material according to the extrusion method, and there is a limitation in the shape of an inner hole. In other words, since there is a limitation in the selection of the material, it is not possible to apply a high-strength material, thus causing corrosion problem. In addition, there is a restriction on the number of holes inside the tube to satisfy the minimum thickness of a partition wall required during extrusion. Such constraints can increase weight and adversely affect performance.

In addition, even if the inner fin tube according to the related art is used to compensate for this type of problem, the process time in manufacturing of tubes having a two-row structure and assembling of a tube assembly is increased. In addition, in the case of an electric vehicle refrigerant type battery cooler having a multi-row structure, the process time may be increased because each assembly should be assembled.

In addition, the inner fin tube according to the related art does not have a separate drainage structure and thus may not cause smooth drainage when condensate is generated, which may cause an unpleasant smell. In addition, since the inner shapes of first-row and second-row tubes are the same, it is difficult to produce independent shapes. In addition, when such tubes according to the related art are inserted into a header 15, its insertion depth is unknown and a deviation occurs during assembly. This can affect performance.

SUMMARY OF THE INVENTION

In order to solve the problems of a heat exchanger for vehicle air conditioning or refrigerant type battery heat management apparatus, the present invention is directed to a tube assembly for a heat exchanger or heat management apparatus in which the tube assembly may be integrally assembled using inner fin tubes having a two-row structure and drainage performance, and corrosion resistance performance may be improved.

According to an aspect of the present invention, there is provided a tube assembly for a heat exchanger or heat management apparatus, including a first-row tube including an inner fin type tube, a second-row tube including an inner fin type tube, a central connection portion that connects the first-row tube to the second-row tube, and a header in which a first-row tube hole and a second-row tube hole, into which ends of the first-row tube and the second-row tube are inserted, are arranged, wherein a cut portion formed in the direction opposite to the end of the first-row tube and the end of the second-row tube inserted into the header is included in the central connection portion.

According to another aspect of the present invention, there is provided a method of manufacturing a tube assembly for a heat exchanger or heat management apparatus, the method including: manufacturing a first-row tube and a second-row tube each of which includes an inner fin type tube, manufacturing a header in which a first-row tube hole and a second-row tube hole, into which ends of the first-row tube and the second-row tube are inserted, are formed, arranging the first-row tube and the second-row tube in a longitudinal direction and forming a central connection portion that is disposed therebetween and connects the first-row tube and the second-row tube, forming a cut portion in the central connection portion in the direction opposite to the end of the first-row tube and the end of the second-row tube inserted into the header, and inserting the ends of the first-row tube and the second-row tube into each tube hole of the header.

The order in which these processes are listed does not imply steps according to a temporal sequence (time chronological steps). Obviously, the order of each of the above-mentioned processes may be variously changed in designing production facilities of those skilled in the art.

The detailed configuration and effects of the present invention introduced above will be apparent through detailed embodiments that will be described later with reference to the drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
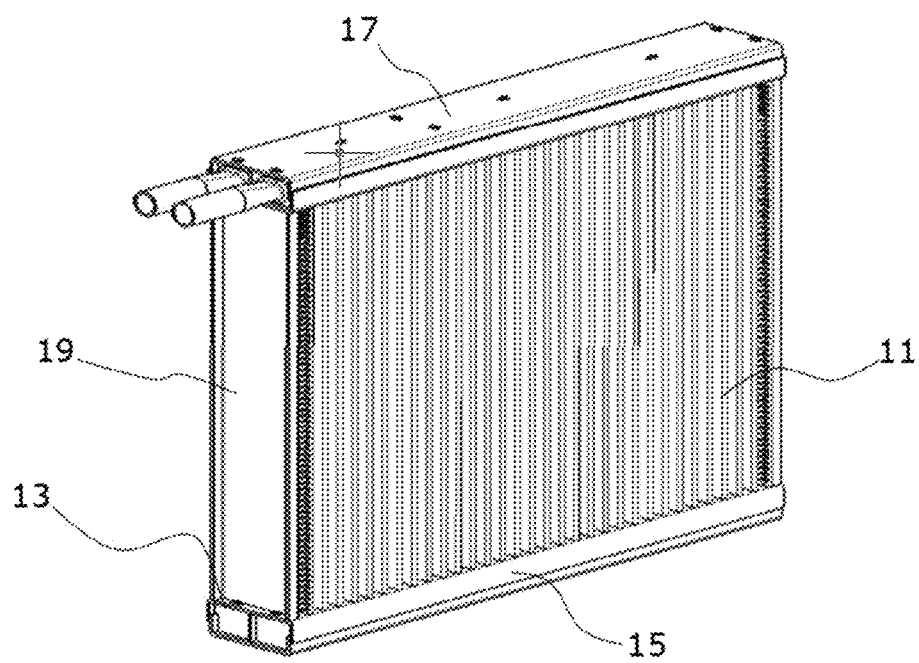
FIG. 1 is a view illustrating an example of a conventional evaporator.
Figure 2:
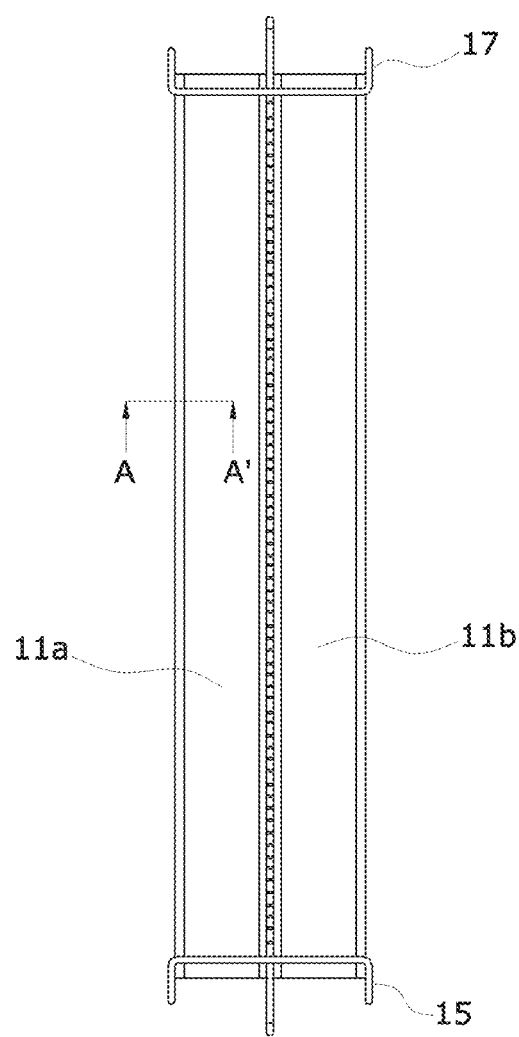
FIG. 2 is a view illustrating tubes having a two-row structure.
Figure 3A:
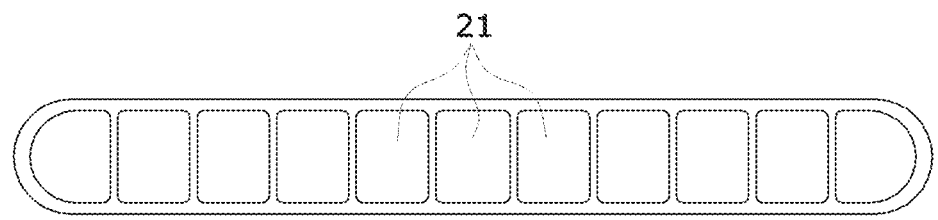
FIGS. 3A and 3B show cross-sectional views taken along line A-A' of one of two-row tubes shown in FIG. 2.
Figure 3B:
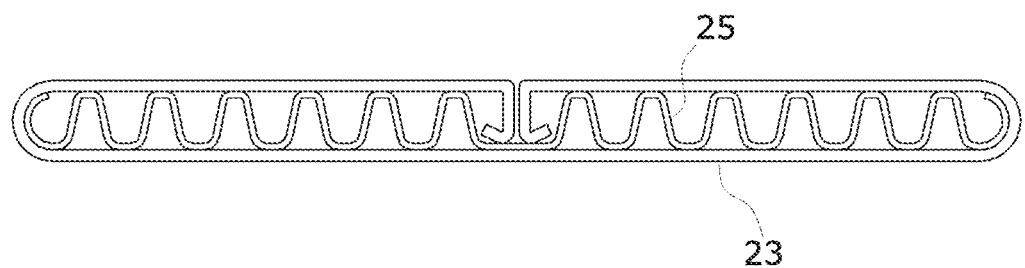

Advantages and features of the present invention and ways to achieve them will be apparent with reference to embodiments described in detail with the attached drawings. However, the present invention is not intended to the following embodiments but may be embodied in various different forms, and the present invention is merely provided so that the disclosure of the present invention is complete and those skilled in the art to which the present invention belongs are completely informed of the scope of the invention, and the present invention is defined by recitation of the claims.

Meanwhile, the terms used in the present specification are merely used to describe particular embodiments and are not intended to limit the present invention. An expression used in the singular encompasses the expression of the plural unless it has a clearly different meaning in the context. In the present specification, it is to be understood that the terms "including" or "having" are intended to indicate the existence of the features, numbers, steps, actions, components, parts, or combinations thereof disclosed in the specification and are not intended to preclude the possibility that one or more other features, numbers, steps, actions, components, parts, or combinations thereof may exist or may be added.

Hereinafter, exemplary embodiments of the present invention will be described in detail with reference to the attached drawings. According to the embodiments of the present invention, a tube assembly for a heat exchanger for vehicle air condition or a refrigerant type battery heat management apparatus has a structure in which each inner fin type tube is assembled with a header in two rows. However, this is just an illustration of one embodiment, and the technical scope of the present invention is not limited thereto.

Throughout the present specification, the heat exchanger for vehicle air conditioning or the refrigerant type battery heat management apparatus will be referred to as a "heat management apparatus." Also, in the description of the embodiments, when reference numerals are added to components of each of the drawings, the same reference numerals are given to the same components even though they are indicated on different drawings, and in the description of the present invention, certain detailed explanations of related well-known configuration or functions are omitted when it is deemed that they may unnecessarily obscure the essence of the invention.

Before describing the tube assembly according to the embodiment of the present invention, a two-row arrangement of an extrusion tube, or inner fin tube, and its assembly structure with a header will be described simply with reference to FIG. 4. Hereinafter, the tube assembly according to the embodiment of the present invention will be mainly structurally described. However, it will be understood that one skilled in the art may easily implement a method of manufacturing the tube assembly through the structural description.

Figure 4A:
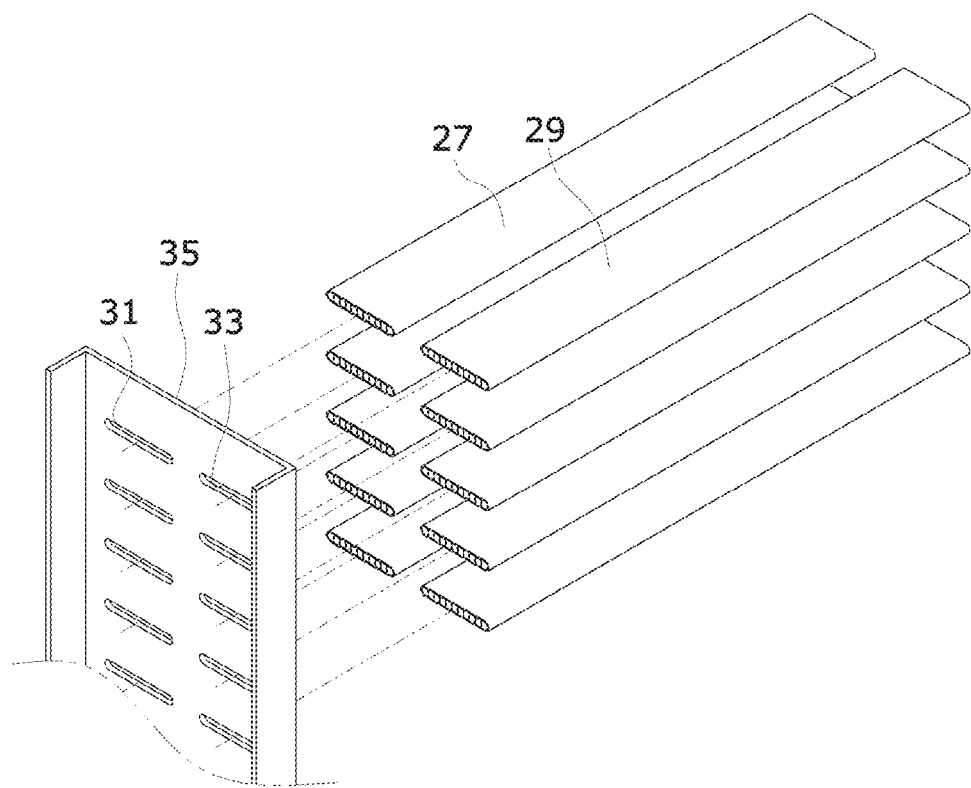
FIGS. 4A and 4B show views illustrating a structure in which conventional inner tubes, or inner fin tubes, in a two-row arrangement type are assembled with a header.
Figure 4B:
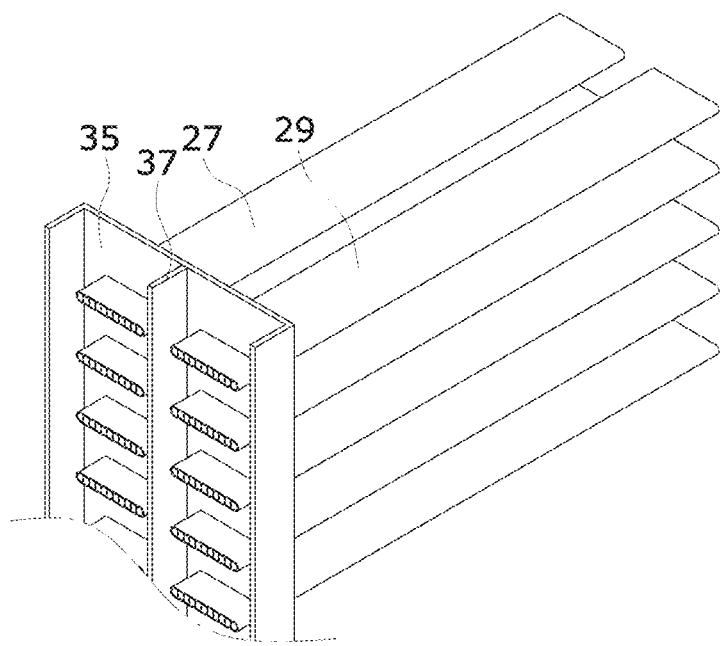

First, as shown in FIG. 4A, a plurality of first-row tubes 27 and a plurality of second-row tubes 29 are manufactured. The plurality of first-row tubes 27 and the plurality of second-row tubes 29 may be manufactured using an extrusion or inner fin method as described above in the Discussion of Related Art. Furthermore, a header 35 is manufactured so that a first-row tube hole 31 and a second-row tube hole 33 into which ends 55 (see FIGS. 7 and 8) of the first-row tube 27 and the second-row tube 29 may be inserted, may be arranged. The ends of the first-row tube 27 and the second-row tube 29 may be inserted into each of the first-row tube hole 31 and the second-row tube hole 33. Next, as shown in FIG. 4B, the ends of the first-row tube 27 and the second-row tube 29 inserted into the header 35 may be aligned at certain locations and bonded to the header 35 using a method such as a brazing method. A partition 37 is attached between the end of the first-row tube 27 and the end of the second-row tube 29, which are mounted on the header 35 and protrude therefrom so that a flow path may be separated from the tube assembly. In this way, the tube assembly for a heat exchanger (or a heat management apparatus) in which the first-row tube 27 and the second-row tube 29 are assembled with the header 35 in a two-row structure, is manufactured. In the two-row tube assembly, the refrigerant flows into the first-row tube 27, and the second-row tube 29 functions as an exit through which the circulated refrigerant is drained.

Now, a structure of an inner fin type tube used in the tube assembly according to the embodiment of the present invention and a method of manufacturing the same will be simply described with reference to FIG. 5.

Figure 5:
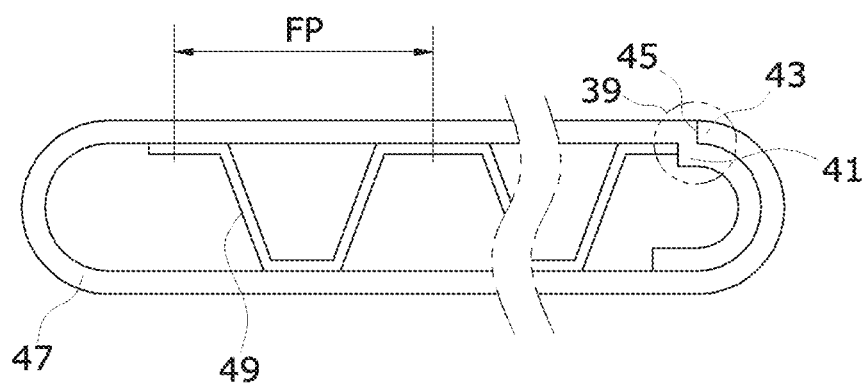
FIG. 5 is a view illustrating a structure of an inner fin type tube used in a tube assembly according to an embodiment of the present invention.

As shown in FIG. 5, the inner fin type tube includes a folded tube 47 outside the inner fin type tube and an inner fin 49 inside the inner fin type tube. A plate formed of a rolling material or the like is folded to constitute the exterior of a tube having a particular cross-sectional shape (e.g., a flat oval shape in FIG. 5). Preferably, a surface 41 inside the inner fin type tube may be sat down to the thickness of a side 43 outside the inner fin type tube so as to form a seating groove 45 so that, at a portion in which both sides of the plate overlap (circle 39), no step is formed on an outside surface of the inner fin type tube and the portion in which both sides of the plate overlap (circle 39) is a smooth outside surface. By folding in this way, the exterior of the folded tube 47 is formed, and a plurality of inner fins 49 are inserted into an inner space of the folded tube 47. The plurality of inner fins 49 are manufactured so that the plate may be folded in a zigzag form and thus a fin wall may be formed. A distance FP between fin walls folded in the zigzag form is variable according to design conditions.

Figure 6:
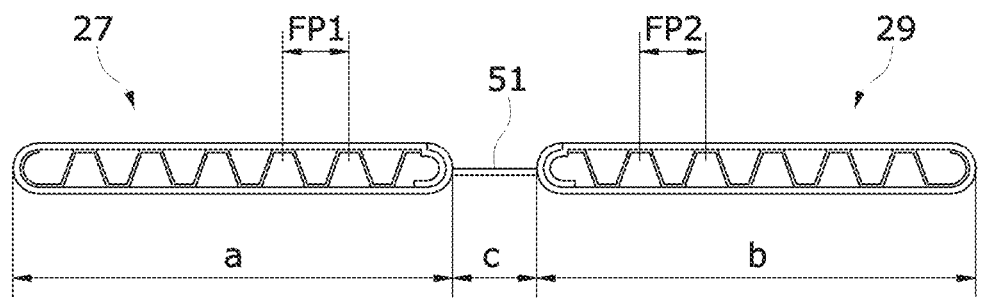
FIG. 6 is a latitudinal cross-sectional view of an assembly including a first-row tube (27) and a second-row tube (29)

FIG. 6 is a latitudinal cross-sectional view of a tube assembly having a two-row structure in which the first-row tube 27 and the second-row tube 29 are bonded according to an embodiment of the present invention.

The first-row tube 27 and the second-row tube 29 are arranged to be coplanar, and a central connection portion 51 is disposed therebetween and connects the first-row tube 27 and the second-row tube 28. The central connection portion 51 is used so that the first-row tube 27 and the second-row tube 29 may be symmetrical to be spaced a certain distance from each other.

Widths a and b of both tubes may be identical or different. A width c of the central connection portion 51 is determined according to design specifications.

An inner fin may be integrally or separately inserted into an inside of each of both tubes according to a working fluid of the heat management apparatus. Distances FP1 and FP2 between fin walls of each inner fin may be identical or different according to refrigerant and flow characteristics. For example, the first-row tube 27 to which the refrigerant is introduced has low dryness and thus the distance FP1 may be decreased so as to improve heat transfer efficiency using evaporation, and the dryness of the second-row tube 29 is high at an exit thereof, and thus the distance FP2 may be further increased so as to minimize resistance.

Figure 7:
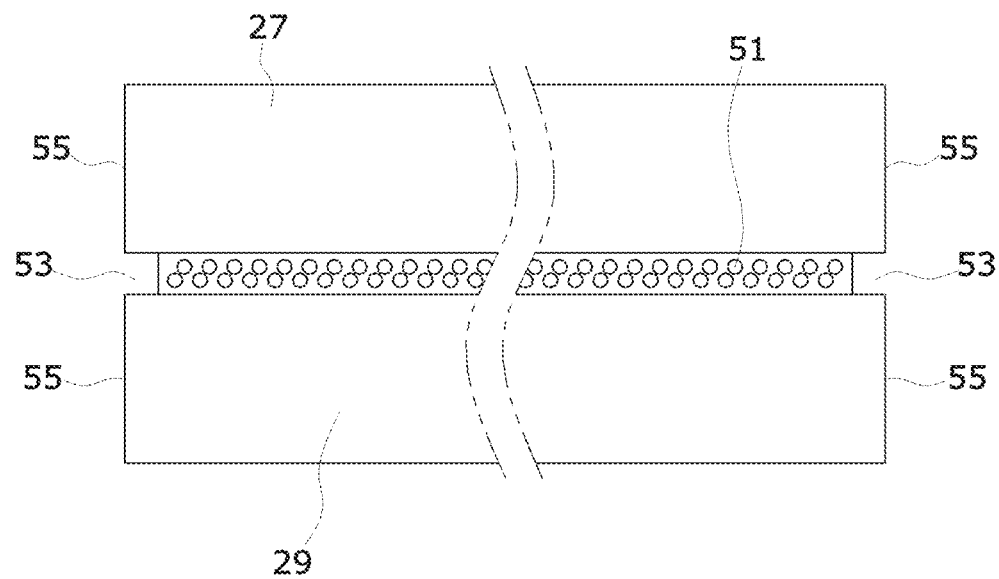
FIG. 7 is an external plan view of FIG. 6.

FIG. 7 is a plan view of FIG. 6 when viewed from the outside and illustrates the shape of the central connection portion 51.

Referring to FIG. 7, a cut portion 53 is formed on the central connection portion 51 towards ends 55 of the first-row tube 27 and the second-row tube 29 to be inserted into the header 35 of FIG. 4. As a result, the longitudinal length of the central connection portion 51 is less than the longitudinal length of the first-row tube 27 and the second-row tube 29. The role of the cut portion 53 will be described with reference to FIG. 8.

Figure 8:
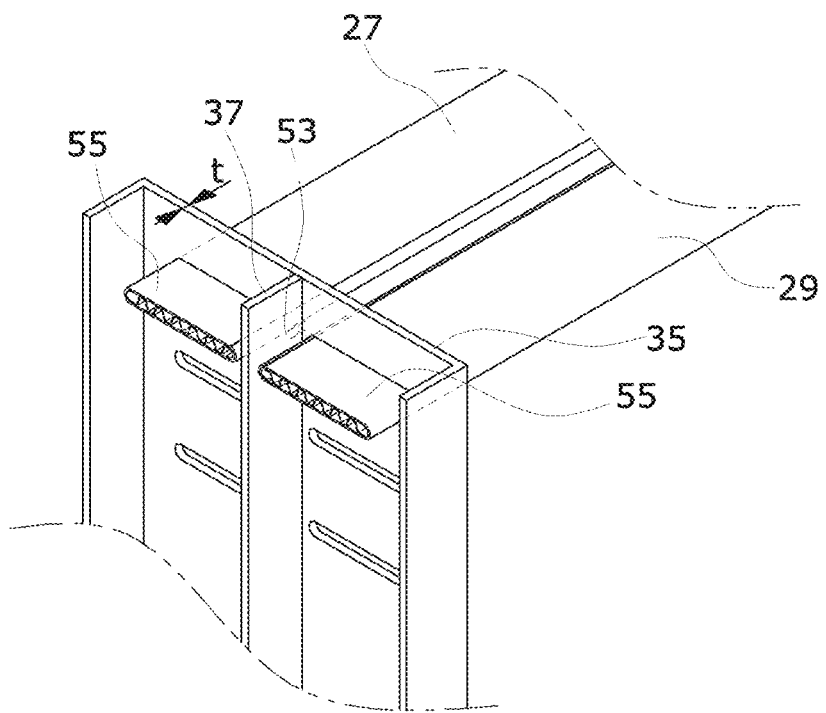
FIG. 8 is an assembly view of a tube assembly of FIG. 7 and a header plate.

FIG. 8 illustrates that the first-row tube the second-row tube 29, and the central connection portion 51, in which the cut portion 53 is formed, are assembled with the header 35. When the ends 55 of the first-row tube 27 and the second-row tube 29 are inserted into the header 35, the cut portion 53 of FIG. 7 is caught by a plate surface of the header 35, and thus, the ends 55 of the first-row tube 27 and the second-row tube 29 enter by the length of the cut portion 53 and no farther. That is, the cut portion 53 functions as a stopper.

FIG. 8 illustrates that the first-row tube 27 and the second-row tube 29, in which the cut portion 53 is formed, are assembled with the header 35. When the ends 55 of the first-row tube 27 and the second-row tube 29 are inserted into the header 35, the cut portion 53 of FIG. 7 is caught by a plate surface of the header 35, and thus, the ends 55 of the first-row tube 27 and the second-row tube 29 enter by the length of the cut portion 53 and no farther. That is, the cut portion 53 functions as a stopper.

The length of the cut portion 53 may vary according to the thickness of the plate of the header 35 and the insertion depth of the ends 55. For example, when the thickness of the plate of the header 35 is t, the length of the cut portion 53 may be defined as [2t<(length of the cut portion 53)<(tube protrusion design value)]. The end protrusion design value of the tube is arbitrary but may be set as about 8 mm. In this way, owing to the stopper function of the cut portion 53, the tube may be inserted into the header 35 to a certain depth so that workability may be improved and an additional end alignment process may be omitted.

Figure 9A:
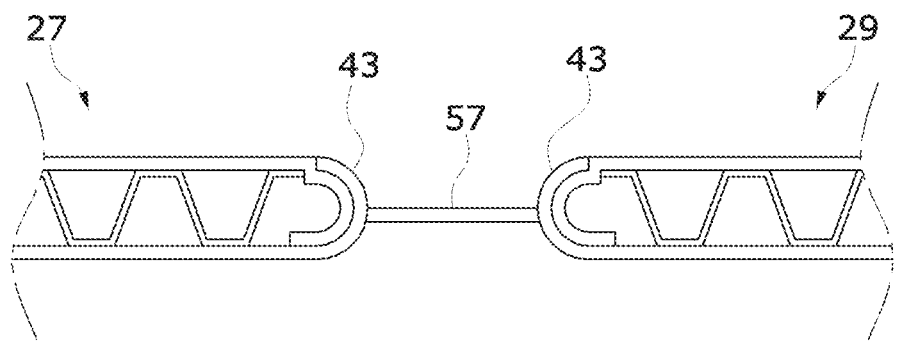
FIGS. 9A and 9B show views for describing a method of connecting the first-row tube (27) to the second-row tube (29)
Figure 9B:
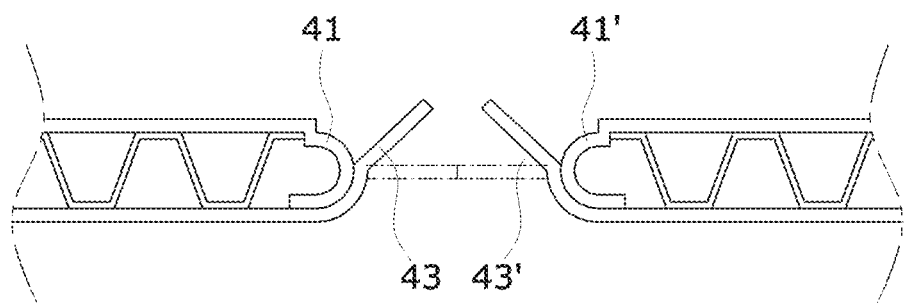

FIG. 9 illustrates an example of a method of forming the central connection portion 51 that connects the first-row tube 27 to the second-row tube 29. FIG. 9A may be referred to as a spacer-bonded method. Here, an additional spacer 57 may be bonded to each of facing sides of the first-row tube 27 and the second-row tube 29 of the inner fin type that are separately manufactured so as to form the central connection portion 51. FIG. 9B may be referred to as a tube-integrated method. Here, when the first-row tube 27 and the second-row tube 29 are manufactured in an inner fin type, sides 43 and 43' (see FIG. 5) outside each of the first-row tube 27 and the second-row tube 29 may not overlap surfaces 41 and 41' inside each of the first-row tube 27 and the second-row tube 29 so as to be folded but may be bent so as to be radially spread toward the facing sides and thus both sides 43 and 43' may be bonded to each other so as to form the central connection portion 51.

Figure 10:
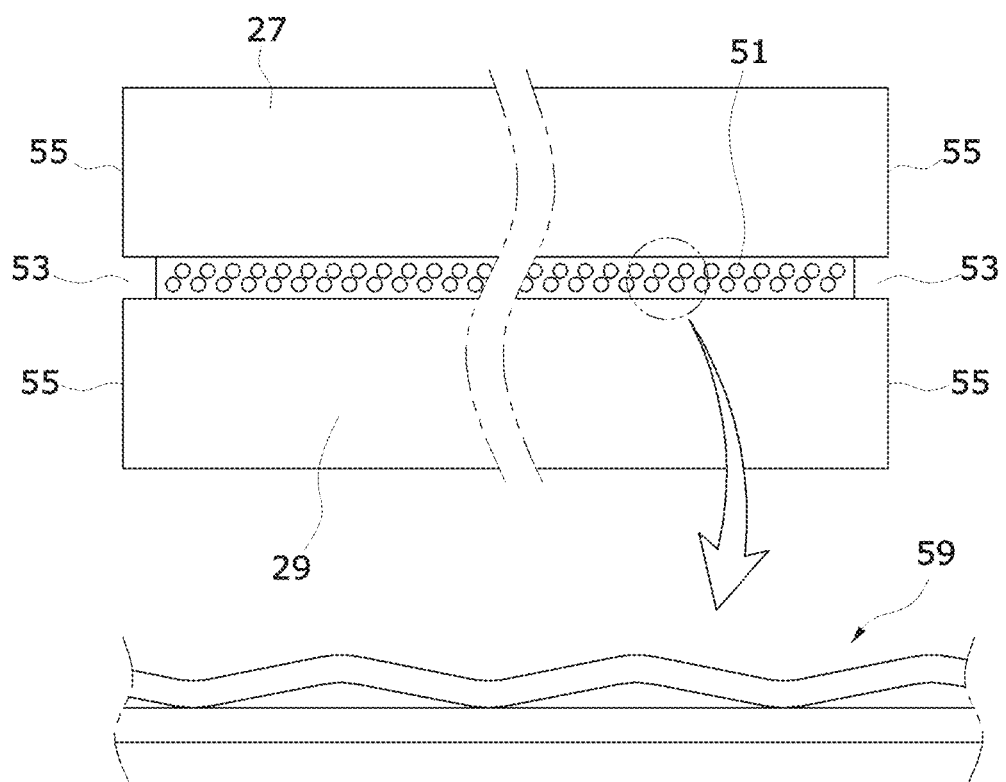
FIG. 10 is a longitudinal cross-sectional view illustrating a part of a central connection portion (51).

Meanwhile, a device that assists with drainage of condensate may be provided in the central connection portion 51 between the first-row tube 27 and the second-row tube 29. For this, two methods are possible. A first one is a method whereby embossings are formed on the central connection portion 51 so that embossings are spaced a certain distance from each other in the longitudinal direction so that longitudinal drainage of the condensate of the evaporator or condenser may be smoothly performed. Particularly, it is easy to apply the first method to the connection method of FIG. 9A. A second one is a method whereby a bent portion 59 is provided in the central connection portion 51 so as to have a longitudinally continuous inclination structure, as shown in FIG. 10. Drainage of the condensate is performed along the surface of the bent portion 59. Particularly, it is easy to apply the second method to the connection method of FIG. 9B. In addition to the two methods, a hole may also be added to the central connection portion 51 according to the type of a heat exchanger so as to function as a drainage hole.

As described above, the present invention has advantages that can be attained when an existing extrusion tube used in a heat exchanger for vehicle air conditioning or a refrigerant type battery heat management apparatus is changed into an inner fin tube. In addition, assembling in a heat exchanger or heat management apparatus using two-row tubes can be improved so that the process can be simplified and the process time can be reduced. In a two-row structure, the tubes are inserted into the header only to a certain depth via a stopper and thus non-uniformity of temperatures in a tank can be minimized.

Furthermore, drainage can be improved by the bending structure of a central portion so that performance and corrosion resistance can be improved. In addition, when the tube is substituted with the extrusion tube, the weight of the tube can be reduced, and thus, the effect of being lightweight can be attained.

Although the exemplary embodiments have been described, one of ordinary skill in the art will readily appreciate that many modifications are possible in the exemplary embodiments without materially departing from the novel teachings and advantages of the exemplary embodiments. Therefore, it is to be understood that the foregoing is illustrative of the exemplary embodiments and is not to be construed as limited to the specific embodiments disclosed, and that modifications to the disclosed embodiments, as well as other embodiments, are intended to be included within the scope of the appended claims. The exemplary embodiments are defined by the following claims with equivalents of the claims to be included therein.

DESCRIPTIONS OF REFERENCE NUMERALS IN THE DRAWINGS tube 11, 11a, 11b, fin 13, header 15, tank 17, side plate 19, multi-channel 21, folded tube 23, inner fin 25, first-row tube 27, second-row tube 29, first-row tube hole 31, second-row tube hole 33, header 35, partition 37, portion 39 in which both sides overlap, surfaces 41 and 41' inside each of the first-row tube 27 and the second-row tube 29, sides 43 and 43' outside each of the first-row tube 27 and the second-row tube 29, seating groove 45, folded tube 47, inner fin 49, central connection portion 51, cut portion 53, end 55, spacer 57

What is claimed is:

1. A tube assembly for a heat exchanger or heat management apparatus, the tube assembly comprising:
   a first-row tube comprising an inner fin type tube;
   a second-row tube comprising an inner fin type tube;
   a central connection portion that connects the first-row tube to the second-row tube; and
   a header comprising a first-row tube hole and a second-row tube hole, and ends of the first-row tube and the second-row tube that are inserted into the first-row tube hole and the second-row tube hole to protrude therefrom, respectively,
   wherein a surface of the central connection portion between the first-row tube and the second-row tube is embossed to form an embossment having a projection relative to the surface of the central connection portion and configured to drain condensate in a longitudinal direction along the surface of the embossed central connection portion,
   wherein a cut portion is formed in the central connection portion between the ends of the first-row tube and the second-row tube inserted into the header, and
   wherein a length of the cut portion is based on a thickness of a material of the header and a length at which the ends of the first-row tube and the second-row tube are inserted into the header and protrude therefrom.

2. The tube assembly of claim 1, wherein the central connection portion is formed by bonding a spacer to each facing side of the first-row tube and the second-row tube.

3. The tube assembly of claim 1, wherein, when the first-row tube and the second-row tube are manufactured in an inner fin type, sides outside each of the first-row tube and the second-row tube are not to overlap surfaces inside each of the first-row tube and the second-row tube so as to be folded but are bent so as to be radially spread toward facing sides and thus the sides outside each of the first-row tube and the second-row tube are bonded so as to form the central connection portion.

4. A method of manufacturing a tube assembly for a heat exchanger or heat management apparatus, the method comprising:
   manufacturing a first-row tube and a second-row tube, each of which comprises an inner fin type tube;
   manufacturing a header having a first-row tube hole and a second-row tube hole, into which ends of the first-row tube and the second-row tube are respectively inserted;
   arranging the first-row tube and the second-row tube in a longitudinal direction and forming a central connection portion that is disposed therebetween and connecting the first-row tube and the second-row tube;
   forming an embossment on a surface of the central connection portion between the first-row tube and the second-row tube, the embossment having a projection relative to the surface of the central connection portion so that condensate is drained in a longitudinal direction along the surface of the embossed central connection portion;
   forming a cut portion in the central connection portion between the ends of the first-row tube and the second-row tube inserted into the header; and
   inserting the ends of the first-row tube and the second-row tube into the first-row tube hole and the second-row tube hole of the header to protrude therefrom, respectively,
   wherein a length of the cut portion is based on a thickness of a material of the header and a length at which the ends of the first-row tube and the second-row tube are inserted into the header and protrude therefrom.

5. The method of claim 4, wherein the forming of the central connection portion comprises bonding a spacer to each facing side of the first-row tube and the second-row tube.

6. The method of claim 4, wherein, when the first-row tube and the second-row tube are manufactured, the forming of the central connection portion comprises not overlapping sides outside each of the first-row tube and the second-row tube with surfaces inside each of the first-row tube and the second-row tube so as to be folded but bending the sides outside each of the first-row tube and the second-row tube so as to be radially spread toward facing sides and thus bonding the sides outside each of the first-row tube and the second-row tube to each other so as to form the central connection portion.

\* \* \* \* \*